United States Patent [19]
Chen et al.

[11] Patent Number: 4,999,832
[45] Date of Patent: Mar. 12, 1991

[54] BROADBAND MULTIRATE SWITCHING ARCHITECTURE

[75] Inventors: Hung-San Chen, Golden; Scott E. Farleigh, Denver; John S. Helton, Louisville; Allen L. Larson, Thornton, all of Colo.

[73] Assignee: AT&T Bell Laboratories, Murray Hill, N.J.

[21] Appl. No.: 441,794

[22] Filed: Nov. 27, 1989

[51] Int. Cl.$^5$ ............................................. H04J 3/16
[52] U.S. Cl. ............................. 370/85.14; 370/58.1; 370/59; 370/68.1; 370/85.15
[58] Field of Search ............................. 370/58.1–58.3, 370/59, 60, 60.1, 63, 65.5, 67, 68, 68.1, 85.12–85.15; 379/93, 94; 340/825.05, 826, 825.79, 825.8

[56] References Cited

U.S. PATENT DOCUMENTS

| | | | |
|---|---|---|---|
| 3,890,471 | 6/1975 | Hachenburg | 370/85.14 |
| 4,206,322 | 6/1980 | Lurtz | 370/63 |
| 4,322,843 | 3/1982 | Beuscher et al. | 370/58.3 |
| 4,485,469 | 11/1984 | Witmore | 370/68 |
| 4,547,877 | 10/1985 | Lehman et al. | 370/58 |
| 4,553,234 | 11/1985 | Brandsma et al. | 370/86 |
| 4,558,444 | 12/1985 | Kennedy et al. | 370/58 |
| 4,587,651 | 5/1986 | Nelson et al. | 370/88 |
| 4,630,259 | 12/1986 | Larson et al. | 370/60 |
| 4,679,191 | 7/1987 | Nelson et al. | 370/84 |
| 4,713,807 | 12/1987 | Caves et al. | 370/94 |
| 4,718,058 | 1/1988 | van Vugt | 370/63 |
| 4,736,371 | 4/1988 | Tejima et al. | 370/95 |
| 4,763,317 | 8/1988 | Lehman et al. | 370/58 |
| 4,769,839 | 9/1988 | Preineder et al. | 370/86 |
| 4,780,870 | 10/1988 | McHarg et al. | 370/60 |
| 4,821,259 | 4/1989 | DeBruler et al. | 370/68.1 |

OTHER PUBLICATIONS

D. L. Carney et al., "The 5ESS Switching System: Architectural Overview", *AT&T Technical Journal*, vol. 64, No. 6 (Jul.-Aug. 85), pp. 1339–1357.

*Primary Examiner*—Douglas W. Olms
*Assistant Examiner*—Alpus H. Hsu
*Attorney, Agent, or Firm*—David Volejnicek

[57] ABSTRACT

A broadband ISDN communication system (10) comprises a plurality of bit-serial synchronous time-division multiplexed ring networks (15) interconnected by a circuit switch (11). In each network, terminal equipment (14) is interfaced to a fiber-optic ring bus (12) by add/drop multiplexers (13). Single time slots (201) on the ring function as independently-assignable channels. Each time slot carries one bit at an 8 Kbps rate. Ring bandwidth is 45 Mbps. The circuit switch is a time-division multiplexed time-space switch. The time stage (301) comprises a plurality of time slot interchangers (TSI 303), one for each switch output port (306). Each TSI unit is connected to all switch input ports (305) and through the space stage to its corresponding output port. The space stage (302) is a time-multiplexed space stage. The switch is fully non-blocking and has broadcast capability. System bandwidth is dynamically allocated to users in single time slot (8 Kbps) increments, under control of a network manager (16).

17 Claims, 4 Drawing Sheets

BROADBAND MULTIRATE SWITCHING ARCHITECTURE

TECHNICAL FIELD

This invention relates generally to communications switching, and particularly to switching of broadband multirate communications, such as may be found in broadband integrated services digital networks (BISDNs).

BACKGROUND OF THE INVENTION

The traditional manner of communication switching is circuit switching. It involves the allocation of some amount of bandwidth (the "circuit") to a communication during formation of a connection for the communication through the switch, and keeping that bandwidth allocated to that communication (i.e., keeping the connection "up") constantly for the duration of the communication. Conventional circuit-switching is not suited for handling of communications that require a bandwidth other than a fixed predefined bandwidth which the switching system has been designed to allocate to every communication. Hence, it is not suited for handling communications that occur at a variety of transmission rates, and particularly not those that occur at a rate higher than the predetermined fixed rate.

To avoid this problem, packet switching has been introduced. Unlike circuit switching, packet switching allocates bandwidth to a communication dynamically and only when the bandwidth is needed. Therefore, it is able to handle communications that occur at a variety of rates. However, packet switching is not without problems of its own. For example, it is not suited for providing services that require continuous and ordered signal transmission and delivery, such as voice and video communications.

A further difficulty with the two abovementioned approaches to switching is their unsuitability for providing broadcast services. On the one hand, braodcasting often causes blocking in conventional circuit switches. On the other hand, broadcasting often causes intolerable or at least undesirable delays of other communications in packet switches.

With the advent of integrated services digital networks (ISDNs), it has become possible to provide a variety of communication services in a single communication network. However, ISDNs presently operate at low transmission rates—typically 64 Kbps per communication—and typically make use of conventional packet and/or circuit switches. Consequently, they are subject to the constraints of those switches enumerated above.

In order to expand the range of services that can be provided by ISDNs, numerous efforts are under way to expand the transmission rates at which they operate into the Mbps range i.e., to develop broadband ISDNs (BISDNs). Unfortunately, the abovementioned problems of conventional circuit-and-packet-switching systems become even more acute at these rates. Consequently, what the art requires is a switching suitable for use in BISDNs that overcomes the problems of the conventional circuit-and-packet-switching systems.

SUMMARY OF THE INVENTION

This invention is directed to overcoming the shortcomings of the prior art. According to an embodiment of the invention, there is provided an improved time-division multiplexed time-and space-switching system. The system, which has a plurality of input ports and a plurality of output ports for receiving and transmitting frames of periodic time slots, comprises a plurality of multi-port time slot interchangers, one for each output port, each one of which is connected to all of the input ports and periodically selects a time slots of each frame of all frames that were simultaneously received at the input ports. The system further includes an arrangement, such as a time-multiplexed space switching stage, that connects the time slot interchangers to their respective output ports and periodically selects for transmission at each output port one of the time slots selected by the output port's respective time slot interchanger. In contrast to prior art switching systems, this switching system has only two stages of switching: a time stage and a space stage. Futher in contrast to a typical prior art switching systems, which use only very few time slot interchangers, this switching system has a time slot interchanger per output port, and each interchanger is connected to all input ports. The switching system has the advantage of being completely non-blocking and of having braodcasting and multicasting capability. Furthermore, the switch causes only one frame time delay of communications passing therethrough, and its broadcasting and multicasting capabilities do not increase the time delay experienced by those communications. And where each time slots carries only a single bit of information, the switching system is able to do both time and space switching on a bit-by-bit basis.

Generally according to the invention, an improved switching system, which has a plurality of input ports each for receiving a different frame having an identical sequence of time slots and a plurality of output ports each for transmitting a frame also having a sequence of time slots, significantly includes a plurality of switching arrangements each connected to all of the input ports and to one of the output ports. Each switching arrangement includes a repeatdly-operating switching stage which selects in the received frames a position of a time slot in the sequence (e.g., a time-division-switching stage such as a time slot interchanger), and a repeatdly-operating switching stage which selects one of the received frames (e.g., a space-division switching stage such as a multiplexer). Each ouput port then transmits, as different time slots of the transmitted frame, individual time slots that have the positions selected by the first-mentioned switching stage in the frames selected by the second-mentioned switching stage.

In addition to the advantages mentioned above, the subject switching system preferably operates at high rates (e.g., 45 Mbps per port), making it suitable for broadband, and specifically braodband ISDN, applications, such as: switching of high-speed data between high-end workstations, phone clusters, personal computers, and other devices requiring high data rate continuous transport; telephony-quality voice and stereo high-fidelity audio transmission; high-speed file transfer; video teleconferencing; fax/graphics/imagery transmission; and full-resolution video transmission.

Preferably, the switching system further includes a plurality of ring communication networks each connected to one input port and one output port. A multi-ring, as opposed to a single-ring, architecture beneficially provides: more total bandwidth and hence provides more bandwidth per user and/or the capability to serve more users; greater reliability in that a failure of one ring does not necessarily bring down the whole system; and an opportunity for functional grouping and segmentation of users, e.g., all users within a single organization may be placed on one ring, or all fax users may be placed on one ring. The plurality of rings are interconnected by the switching stages and carry frames of time slots between the switching stages and users, who are illustratively connected to the rings by add/drop multiplexers. Each time slot on the ring carries one bit of information, illustratively at an 8 Kbps rate, and the time slots of a frame are independently and dynamically assignable for use by users on a "per call" basis. User channels having a multiplicity of rates can be configured thereby as needed, starting with channels of 8 Kbps and increasing in 8 Kbps increments up to the full capacity of a ring, e.g., 45 Mbps. Channels implementable thereby include 8 Kbps DCP S channels, 16 Kbps ISDN D channels, 32 Kbps ADPCM compressed telephony channels, 56 Kbps DSO data channels, 64 Kbps DCP I and ISDN B channels, 1.5 Mbps T1 channels, 4.5 Mbps T3 channels, etc. Add/drop multiplexing is a technique particulary suited for providing a broad range of services in a simple manner, by means of interface hardware that provides synchronous rate adaption between a user's device and the switching system. The technique decouples the interface circuitry from the switching fabric and its ports, and additonally makes the operation of the switching system fairly independent of any communication protocol that nay be selected for the system. A plurality of the interfaces may be attached to each of the rings in a serial fashion, thus resulting in a network architecture of rings intercoupled in a central star fashion. Another advantage of the switching system architecture is that it provides a complement to the functionality of packet-networks for services that are not handled well by packet-switching technology. Yet, the ring structure makes possible the inclusion of certain packet switching modes within each ring, using existing token passing protocols. Such a capability is desirable for the implementation of control channels within the system, for example.

These and other advantages and features of the invention will become more apparent from the following description of an illustrative embodiment of the invention taken together with the drawing.

DETAILED DESCRIPTION

Figure 1:
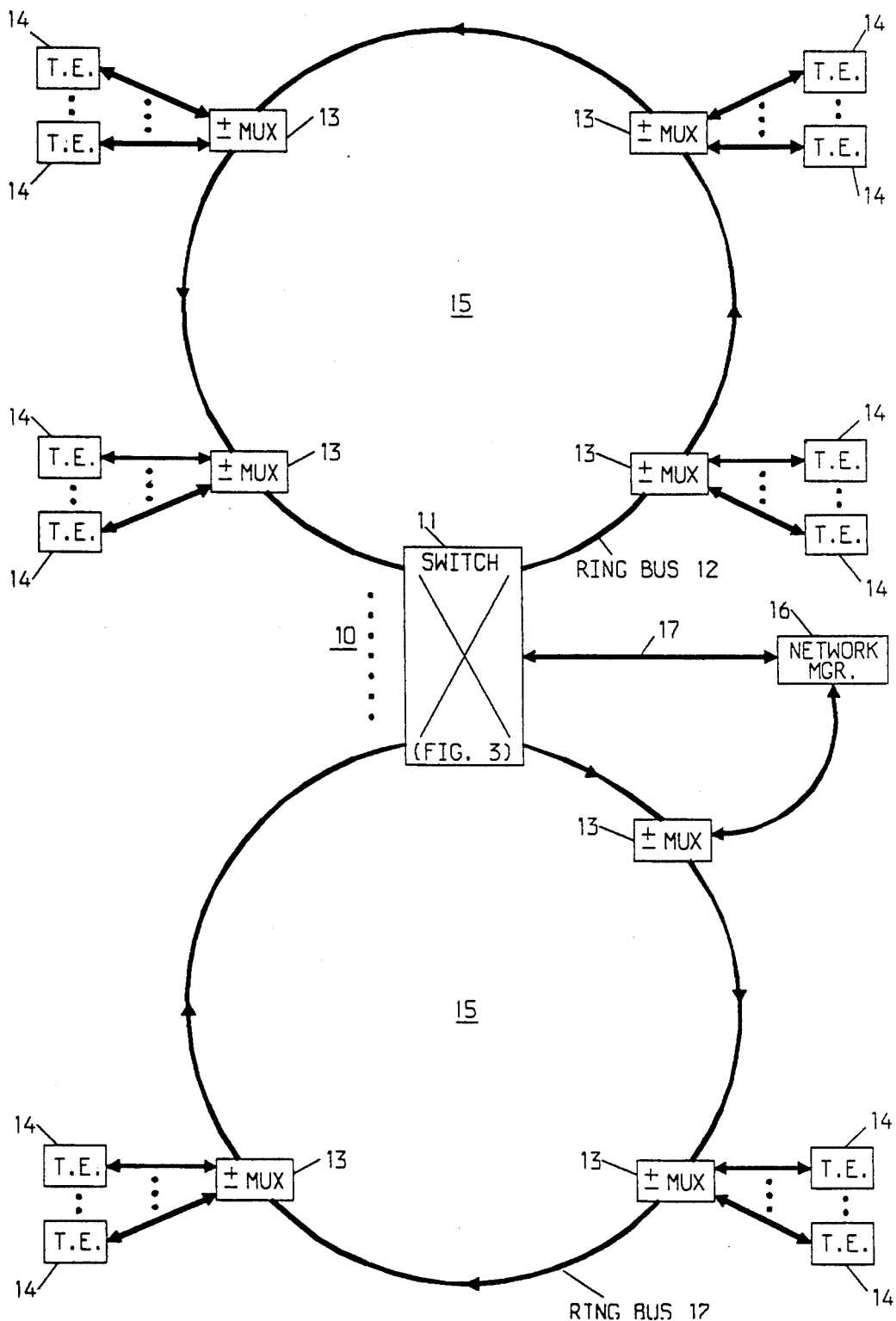
FIG. 1 is a block diagram of an illustrative telecommunication system embodying the invention.

FIG. 1 shows an illustrative communication system 10, which is illustratively a braodband integrated services digital network (BISDN). System 10 comprises a plurality of ring networks 15 interconnected by a switch 11. Ring networks are well known in the art. A ring network 15 comprises a ring bus 12 that functions as the communication medium of the network 15. In this example, bus 12 is a serial, time-division, fiber optic bus operating at 45 Mbps. Connected to bus 12 are a plurality of add/drop multiplexers (± mux) 13, each one of which interfaces one or more units of terminal equipment (T.E.) 14 to bus 12. A multiplexer 13 receives communications destined for its connected terminal equipment 14 over bus 12 and forwards them to connected terminal equipment 14. Multiplexer 13 also receives communications from its connected terminal equipment 14 and transmits them over bus 12. Such multiplexers 13 are known in the art. Units of terminal equipment 14 are, for example, telephones, computers, audio transmiters and receivers, and video transmitters and receivers. Units of terminal equipment 14 may also include gateways to other communication systems.

In one of the ring networks 15, and add/drop multiplexer 13 interfaces a network manager 16 to ring bus 12. Network manager 16 is an intelligent unit (e.g., a computer) that controls the flow of communications within system 10. Specifically, manager 16 assigns bandwidth on buses 12 for use by multiplexers 13, and specifies the interconnections that are to be established and torn down by switch 11. For this latter purpose, manager 16 is communicatively connected to switch 11 by a control link 17. Communication network managers are well known in the art.

Figure 2:
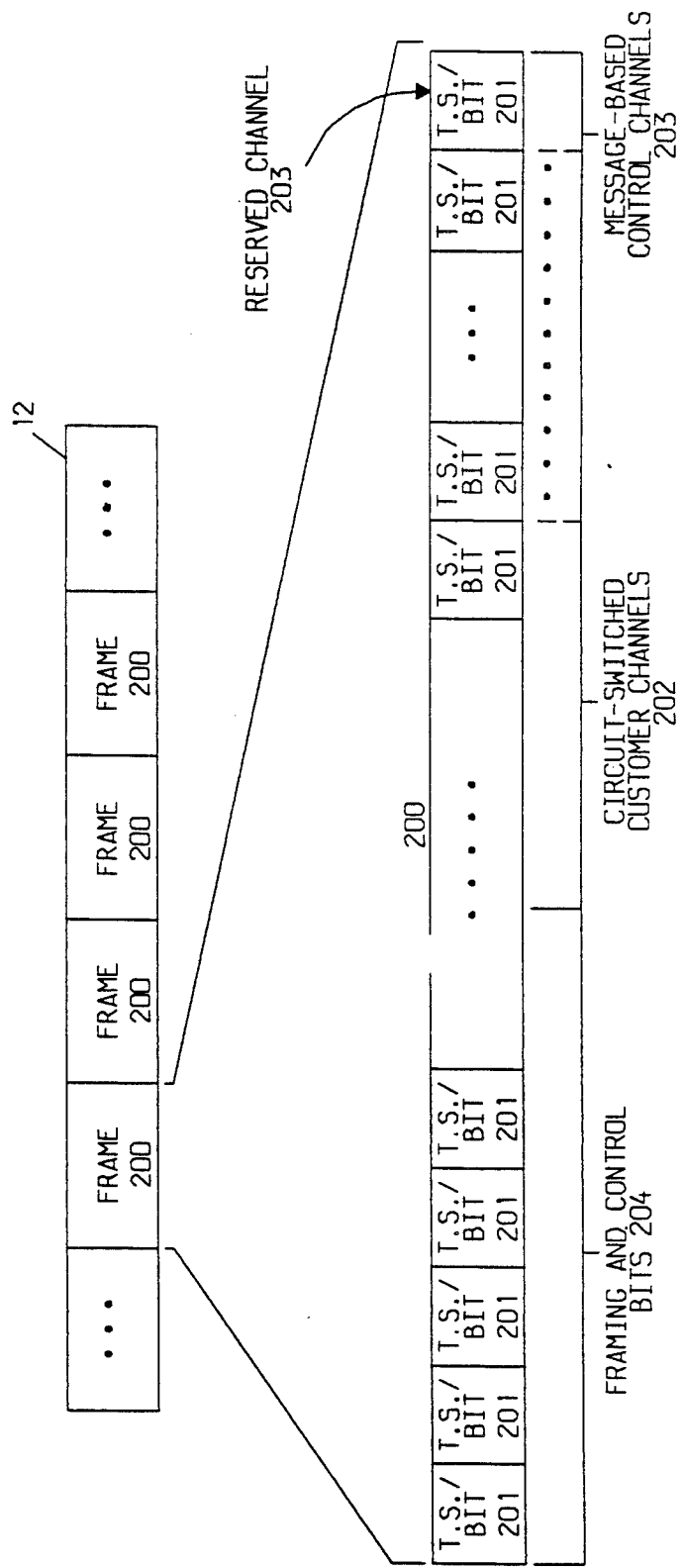
FIG. 2 is a block diagram of the communication format of the ring buses of the system of FIG. 1.

Turning to FIG. 2, it shows the communication format used on bus 12. But 12 is a synchronous communications medium. It carries communications in the form of repeating frames 200 each one of which comprises a plurality of time slots 201. Each frame 200 illustratively consist of 5592 time slots 201, and each time slot 201 carries one bit data; consequently, both bits and time slots will subsequently be referred to by the numeral 201. Each frame 200 has a duration of 125 μs, giving each time slot 201 and 8 Kbps bandwidth. Each time slot 201 of a frame 200 may form a separate communications channel, or a plurality of time slots 201 of a frame 200 may be combined to form a higher-speed channel. In this example, the maximum channel bandwidth is 45 Mbps. Bandwidth may be allocated to channels in one time slot 201, or 8 Kbps, increments. As shown in FIG. 2, some number of bits 201 of each frame 200 are used as framing and control bits 204. The number and placement of these bits 204 within a frame 200 are a function of the particular communication format adopted for buses 12. All but of the remaining time slots 201 of each frame 200 may be used to form customer channels 202, while the remaining one time slot 201 of each frame 200 is always reserved for a control channel 203. However, additional time slots 201 may be dynamically allocated to control channel 203, or to the information of additonal control channels 203, by network manager 16. Customer channels 202 are circuit-switched, while the one or more control channels 203 are message-based, e.g., packetized.

Add/drop multiplexers 13 communicate with network manager 16 via the one more control channels 203 in a conventional manner. Multiplexers 13 use channels 203 to request allocation and deallocation of time slots 201 to customer channels 202 for use by their connected terminal equipment 14, and to provide manager 16 with destination addresses for those channels 202. Multiplexers also use channels 203 to receive from manager 16 the requested allocations and deallocations, including information identifying the particular allocated and deallocated time slots 201, as well as information idetifying channels 202 incoming from terminal equipment 14 connected to other multiplexers 13. Multiplexers 13 retrieve information destined for their connected terminal equipment 14 from time slots 201 of the allocated incoming channels 202, and insert information from their connected equipment 14 into time slots 201 of the allocated outgoing channels 202.

Figure 3:
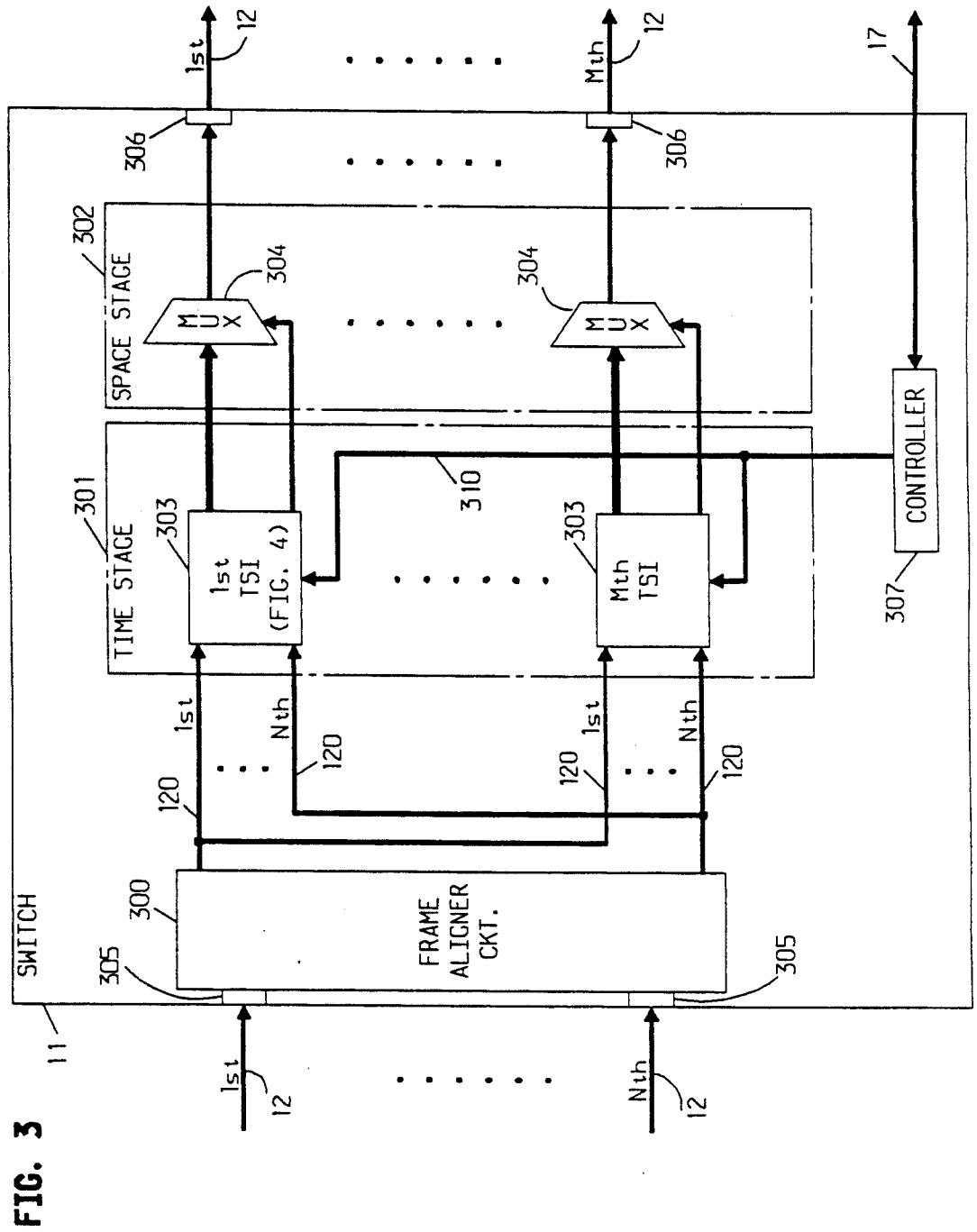
FIG. 3 is a block diagram of the switch of FIG. 1.

Switch 11 is shown in FIG. 3. Switch 11 includes a plurality of input ports 305 and a plurality of output ports 306. While in the example of FIG. 1, the number of input ports 305 and output ports 306 is the same, it need not always be so; the number of input ports may be greater than or smaller than the number of output ports. Each ring bus 12 is connected to one input port 305 and one output port 306 of switch 11. Communication signals flow in a bus 12 in one direction only, and each bus 12 is connected to switch 11 in such a manner that communications flow from bus 12 into switch 11 at an input port 305 and flow from switch 11 into bus 12 at an output port 306. From input ports 305, incoming communications flow into a frame aligner circuit 300. Circuit 300 ensures that transitions between two adjacent frames 200 incoming into switch 11 from a bus 12 occur at the same instant on all buses 12, in a conventional manner. Circuit 300 then outputs the frame-aligned communications to the remainder of switch 11 via links 120. A different link 120 serves each input port 305.

Switch 11 includes two stages of switching: a time stage 301 followed by a space stage 302. Time stage 301 comprises a plurality of time slot interchangers (TSIs) 303, one for each output port 306. All links 120 are connected to inputs of each TSI 303. Consequently, each TSI 303 receives all communications incoming to switch 11 at every port 305, i.e., across every bus 12. Space stage 302 is a time-multiplexed space switch that comprises a plurality of multiplexers 304, one for each TSI 303. The input of a different multiplexer 304 is connected to the output of each TSI 303, and the output of a different multiplexer 304 is connected to each bus 12 via an output port 306. Control over the operation of switch 11 is exercised by a controller 307. Controller 307 receives its instructions from network manager 16 via control link 17, and exercises its control over switch 11 via a control bus 310 that connects to each TSI 303.

Figure 4:
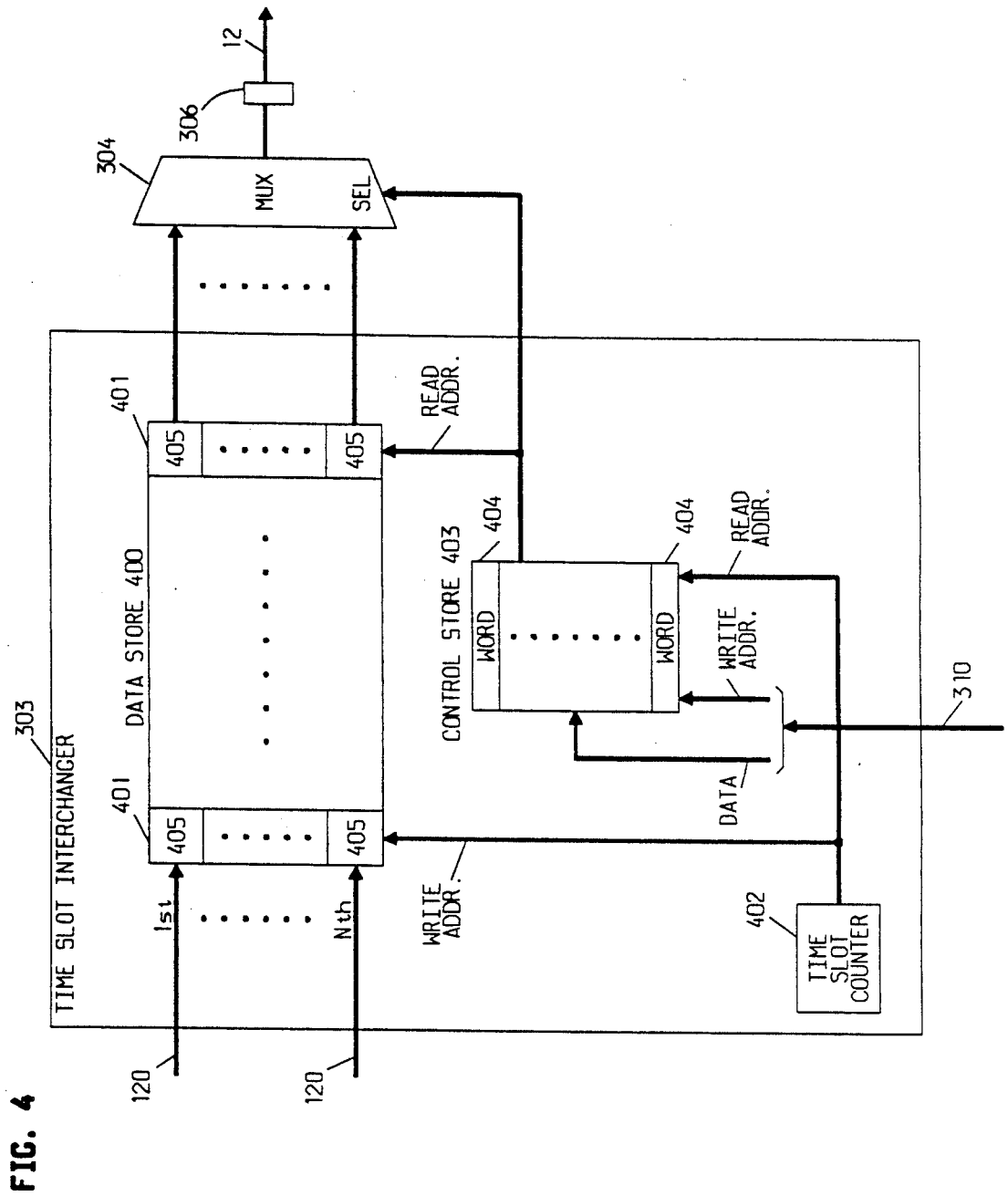
FIG. 4 is a block diagram of a time slot interchanger of the switch of FIG. 3.

An illustrative TSI 303 and a connected multiplexer 304 are shown in FIG. 4. Both are conventional units. TSI 303 includes a data store 400 that stores a plurality of memory words 401. In this example, the number of words 401 is twice the number of time slots 201 in a frame 200, or 11184 words. Each word 401 has a plurality of bits 405, one bit 405 for each input port 305. Each bit 405 position in words 401 has a bit-serial input connected to a different link 120. Each bit 405 position in words 401 also has a bit-serial output, giving data store 400 a word 401-wide bit-parallel output which is connected to a bit-parallel input of multiplexer 304. The writing of data into, and the reading of data out of, data store 400 are controlled by a time slot counter 402 and a control store 403. Counter 402 is a cyclical counter that sequentially generates the numbers of twice the number of time slots 201 of a frame 200 once every two frame time periods. These numbers are applied as addresses of sequential words 401 to a write address control input of data store 400, where they control the storage of data coming into data store 400 on each link 120. As a result, each word 401 is write-addressed once every two frame 200 time periods; each word 401 stores one bit 201 from each bus 12; successive words 401 store successive incoming bits 201; and words 401 together store up to two successive frames 200 from each bus 12.

The numbers generated by time slot counter 402 are also applied to a read address control input of control store 403. Control store 403 stores a plurality of memory words 404, one for each time slot 201 of two frames 200. Each control store 403 word 404 contains the address (i.e., the number) of a data store 400 word 401 and of a bit 405 within that word 401. In response to a time slot 201 number incoming from counter 402, the contents of the control store 403 word 404 which is addressed therby are output by control store 403. The portion thereof that identifies a word 401 is applied to a read address control input of data store 400, and a portion that identifies a bit 405 within that word 401 is applied to a select control input of multiplexer 304. The address control input of data store 400 determines which word 401 is supplied by data store 400 to multiplexer 304, and the select control input of multiplexer 304 to the connected output port 306. As a result, during each time slot 201 period, a word is read out from data store 400 and a bit of that word 401 is output by a multiplexer 304 onto the connected bus 12. The read and write addresses supplied to data store 400 always address words 401 in different halves of data store 400, i.e., while bits 201 of a frame 200 that is stored in data store 400 are being read out, bits 201 of the successive incoming frame 200 are being written into data store 400. This occurs at each TSI 303 and multiplexer 304.

The requisite depth, i.e., number of words in each store 400 and 403, is determined by the formula $$D = \frac{Rmax}{Rmin}$$

where
D = the store depth,
R max = the highest per-channel bit rate that is to be handled, and
R min = the lowest per-channel (including substrate channel) bit rate that is to be handled In operation, a time slot 201 from every link 120 is received by data store 400 of each time slot interchanger 303 every time slot period. Simultaneously-received time slots 201, one from each link 120 are stored in a single word 401 of data store 400; successively-received time slots 201 are stored in successive words 401. Consequently, every time slot interchanger 303 receives the same input. When a full frame 200 of time slots 201 has been received from each link 120, a particular time slot 201 of each one of those received frames 200 is selected each time slot period by control store 403: control store 403 uses the READ ADDR line to read out of data store 400 the word 401 which stores the particular, selected time slot 201 of each of the received frames 200. During a time slot period, control stores 403 of different time slot interchangers 303 may select the same word 401 or different words 401 of their corresponding data stores 400. Also during each time slot period, the particular time slot 201 of a particular received frame 200 is selected by multiplexer 304: control store 403 uses the SEL control input of multiplexer 304 to select only one of the bits 405 of the word 401 that has been read out of data store 400. The selected time slot 201 of the selected frame 200 is then transmitted at output port 306. Again, during a time slot period, multiplexers 304 associated with different time slot interchangers 303 may select the same bit 405 or different bits 405 of a read-out word 401. Thus, during any time slot period, different output ports 306 may transmit the same time slot 201 of the same frame 200, or different time slots 201 of the same frame 200, or the same slot 201 of different frames 200, or different time slots 201 of different frames 200.

In consequence of the above-described structure and function of switch 11, any time slot 201 incoming to switch 11 on any bus 12 can be switched by switch 11 to any outgoing time slot 201 of any bus 12, in a completely non-blocking manner, and with only a one frame 200 time delay caused by switch 11. Furthermore, any incoming time slot 201 can be switched to a plurality of outgoing time slots, giving switch 11 a broadcasting capability without increasing the time delay caused by switch 11.

Control store 403 is programmed by controller 307 via control bus 310. Controller 307 applies addresses of words 404 to a write address control input of control store 403 at the same time that it applies data that is to be stored by words 404 to a data input of control store 403.

Of course, it should be understood that various changes and modifications to the illustrative embodiment described above will be apparent to those skilled in the art. Such changes and modifications can be made without departing from the spirit and the scope of the invention and without diminishing its attendant advantages. It is therefore intended that all such changes and modifications be covered by the following claims.

We claim:

1. A switching system comprising:
   a plurality of input ports, each input port for receiving a different frame each comprising an identical sequence of time slots;
   a plurality of output ports, each output port for transmitting a frame each comprising a sequence of time slots; and
   a plurality of switching means, each switching means connected to all of the input ports and to one of the output ports and each including its own
   repeatedly-operating first means for selecting in the received frames a position of a time slot in the sequence, and
   repeatedly-operating second means for selecting one of the received frames.
   wherein the connected output port transmits individual time slots having the positions selected by the first means in the frames selected by the second means as different time slots of the transmitted frame.

2. The system of claim 1 wherein each time slot carries one bit of information.

3. The system of claim 1 wherein
   the first means comprise means for selecting from the received frames time slots having a same position in the sequence, and
   the second means comprise means for picking from the selected time slots a time slot of an individual one of the received frames,
   wherein the connected output port transmits each picked time slot as a different time slot of the transmitted frame.

4. The system of claim 1 further comprising
   a plurality of communication rings each connected to one of the input ports and one of the output ports, each ring conveying frames of time slots transmitted thereon by users of the system to the connected input port and for conveying frames of time slots transmitted thereon by the connected output port to the users of the system.

5. The system of claim 4 wherein each ring comprises at least one means for extracting for the users from the conveyed frames individual time slots transmitted by the output port and inserting into the conveyed frames individual time slots supplied by the users.

6. A time-division multiplexed switching system for switching periodic time slots, comprising:
   a plurality of input ports for receiving frames of time slots;
   a plurality of output ports for transmitting frames of time slots;
   a plurality of time slot interchange means, each time slot interchange means connected to all input ports and corresponding to a respective one of the output ports, for periodically selecting a time slot of each frame of all frames that were simultaneously received at the input ports; and
   means connecting the plurality of time slot interchangers to their respective output ports for periodically selecting for transmission at each output port one of the time slots selected by the time slot interchanger connected to the respective output port.

7. The system of claim 6 wherein each time slot carries one bit of information.

8. The system of claim 6 further comprising
   a plurality of communication rings interconnected by the plurality of time slot interchangers and selecting means, each communication ring connected to an input port and an output port for conveying time slots from system users to the connected input port and conveying time slots from the connected output port to system users.

9. The system of claim 8 wherein each time slot carries one bit of information.

10. The system of claim 9 wherein each ring conveys communications in time-division multiplexed bit-serial format.

11. The system of claim 10 wherein each time slot of a frame is assignable for use to a user independently of the other time slots of the frame.

12. A time-division multiplexed switching system comprising:
    a plurality of input ports, each input port for receiving a sequence of different frames each comprising an identical sequence of time slots;
    a plurality of output ports, each output port for transmitting a sequence of frames each comprising a sequence of time slots;
    a time-switching stage having a plurality of time slot interchange means, each time slot interchange means corresponding to a different one of the output ports and each connected to all of the input ports, for selecting from frames received by the plurality of input ports time slots having a same position in the sequence; and
    a space-switching stage comprising means for picking from the time slots selected by each individual time slot interchange means a time slot for transmission in a frame by the output port corresponding to the individual time slot interchange means.

13. The system of claim 12 wherein
    each time slot has a period of duration,
    the input ports each receive a time slot every time slot period,
    each time slot interchange means select time slots every time slot period, the picking means pick time slots every time slot period, and the output ports each transmit a picked time slot every time slot period.

14. The system of claim 13 wherein during any individual time slot period the input ports receive time slots of frames different from the frames from which the time slot interchange means, the picking means, and the output ports select, pick, and transmit time slots during the individual time slot period.

15. The system of claim 12 further comprising a plurality of communication rings interconnected by the time and space switching stages and each connected to one of the input ports and one of the output ports, each ring conveying frames of time slots transmitted thereon by users of the system to the connected input port and for conveying frames of time slots transmitted thereon by the connected output port to the users of the system.

16. The system of claim 12 wherein each time slot carries one bit of information.

17. The system of claim 16 further comprising a plurality of communication rings conveying communications in bit-serial format and interconnected by the time and space switching stages, each communication ring connected to one of the input ports and one of the output ports, each ring conveying frames of time slots transmitted thereon by users of the system to the connected input port and for conveying frames of time slots transmitted thereon by the connected output port to the users of the system.

* * * * *